Patented Nov. 1, 1927.

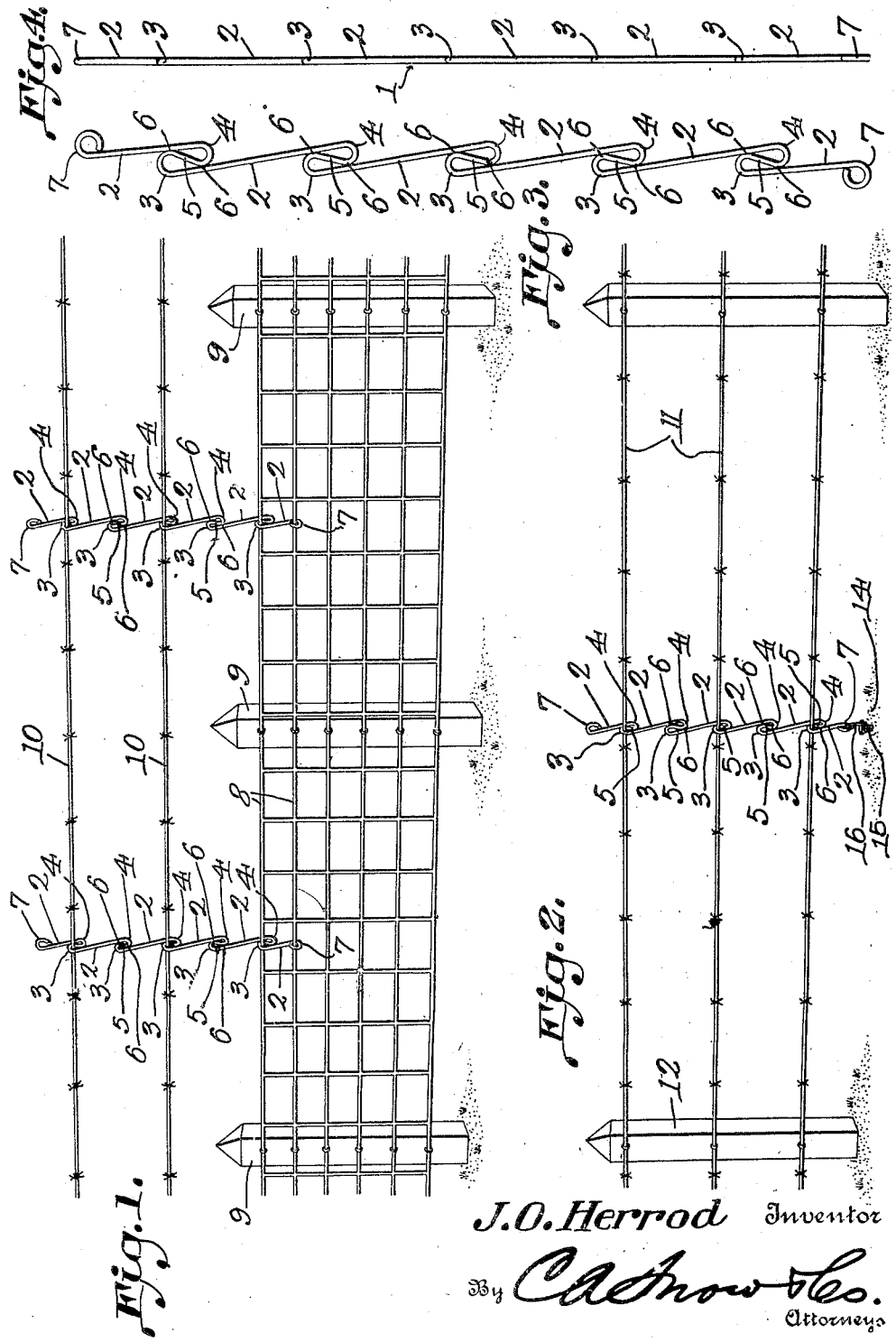

1,647,913

UNITED STATES PATENT OFFICE.

JESSIE O. HERROD, OF MERIDIAN, MISSISSIPPI.

FENCE STAY.

Application filed March 18, 1927. Serial No. 176,544.

This invention aims to provide a novel but simple and effective stay which may be connected to the horizontal wires of a fence, to prevent the wires from being hooked upwardly by cattle, and to prevent the wires from being pressed downwardly should the operator desire.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows one use to which the stay forming the subject matter of this application may be put;

Figure 2 is a perspective view showing another way in which the device may be employed;

Figure 3 is a side elevation of the stay;

Figure 4 is an elevation wherein the stay is viewed edgewise.

The device forming the subject matter of this application is fashioned from wire or metal rod having some resiliency. A strip 1 is provided and includes a plurality of approximately parallel inclined arms 2 merging into oppositely projecting loops 3 and 4 having a common side 5, the loop of each arm bearing laterally against the other arm, as shown at 6. At its ends, the strip 1 is supplied with eyes 7.

In Figure 1, the lower eye 7 and the next adjacent loop 3 are engaged with the horizontal wires 8 of a fence shown as carried upon posts 9. Any desired number of the loops 3 may be engaged with supplemental wires 10 located above the fence 8—9. The construction, obviously, is such that the wires 10 cannot be hooked upwardly by cattle.

In Figure 2, certain of the loops 3 are engaged with the wires 11 of a fence including posts 12, the wires 11 being held by the tie, against upward movement, the lowermost eye 7 in Figure 2 may be connected with the ground 14 in any suitable way, for instance by means of a pin 15 driven into the ground, and a short length of wire 16 engaged with the pin 15, and with the lowermost eye 7 of the stay.

If desired, the wires, such as the wires 10—10, 8—8, or 11—11, may be mounted in the loops 4 instead of in the loops 3, and, then, the wires will be held against downward movement. The stay shown in Figure 4 may be turned end for end, and either end of the stay may be disposed uppermost. Because each of the loops 3—4 bears yieldingly against the arm 2, as shown at 6, the fence wires will be held securely in either of the loops 3 or 4, the strip having spring enough so that the fence wire can be released forcibly from the loop 3 or the loop 4 upon occasion.

What is claimed is:—

A fence stay provided at its ends with anchorage means, and comprising parallel arms, each arm being connected to an adjoining arm by oppositely projecting wireholding loops of like shape, each loop having contact, near to its end, with one of the arms, all of the arms and all of the loops being located in the same plane.

In testimony that I claim the foregoing as my own, I have hereto affixed my signature.

JESSIE O. HERROD.